No. 655,586. Patented Aug. 7, 1900.
R. SIMON.
DRYING MACHINE.
(Application filed Feb. 5, 1900.)

(No Model.) 5 Sheets—Sheet 1.

Witnesses:
H. C. Myers.
W. Lee Helms.

Inventor
Richard Simon
By James L. Norris
Atty

No. 655,586. Patented Aug. 7, 1900.
R. SIMON.
DRYING MACHINE.
(Application filed Feb. 5, 1900.)
(No Model.) 5 Sheets—Sheet 2.

Witnesses:
H. C. Meyners
N. Lee Helus

Inventor
Richard Simon
By James L. Norris
Atty

No. 655,586. Patented Aug. 7, 1900.
R. SIMON.
DRYING MACHINE.
(Application filed Feb. 5, 1900.)

(No Model.) 5 Sheets—Sheet 3.

Witnesses:
H. C. Meyers.
W. Lee Helms.

Inventor
Richard Simon

By James L. Norris
Atty

No. 655,586. Patented Aug. 7, 1900.
R. SIMON.
DRYING MACHINE.
(Application filed Feb. 5, 1900.)
(No Model.) 5 Sheets—Sheet 4.

Witnesses
Inventor
Richard Simon
By James L. Norris
Atty

No. 655,586. Patented Aug. 7, 1900.
R. SIMON.
DRYING MACHINE.
(Application filed Feb. 5, 1900.)
(No Model.) 5 Sheets—Sheet 5.

Witnesses:
H. C. Meyers.
N. Lee Helms.

Inventor
Richard Simon

By James L. Norris
Atty

UNITED STATES PATENT OFFICE.

RICHARD SIMON, OF NOTTINGHAM, ENGLAND.

DRYING-MACHINE.

SPECIFICATION forming part of Letters Patent No. 655,586, dated August 7, 1900.

Application filed February 5, 1900. Serial No. 4,071. (No model.)

*To all whom it may concern:*

Be it known that I, RICHARD SIMON, of Zulla road, Nottingham, England, have invented an Improvement in Drying-Machines; and I do hereby declare the nature of this invention and in what manner the same is to be performed to be particularly described and ascertained in and by the following statement with reference to the accompanying drawings and the letters marked thereon.

My invention relates to drying-machines; and it consists in the construction, combination, and arrangement of parts hereinafter described and claimed.

Figure 1:
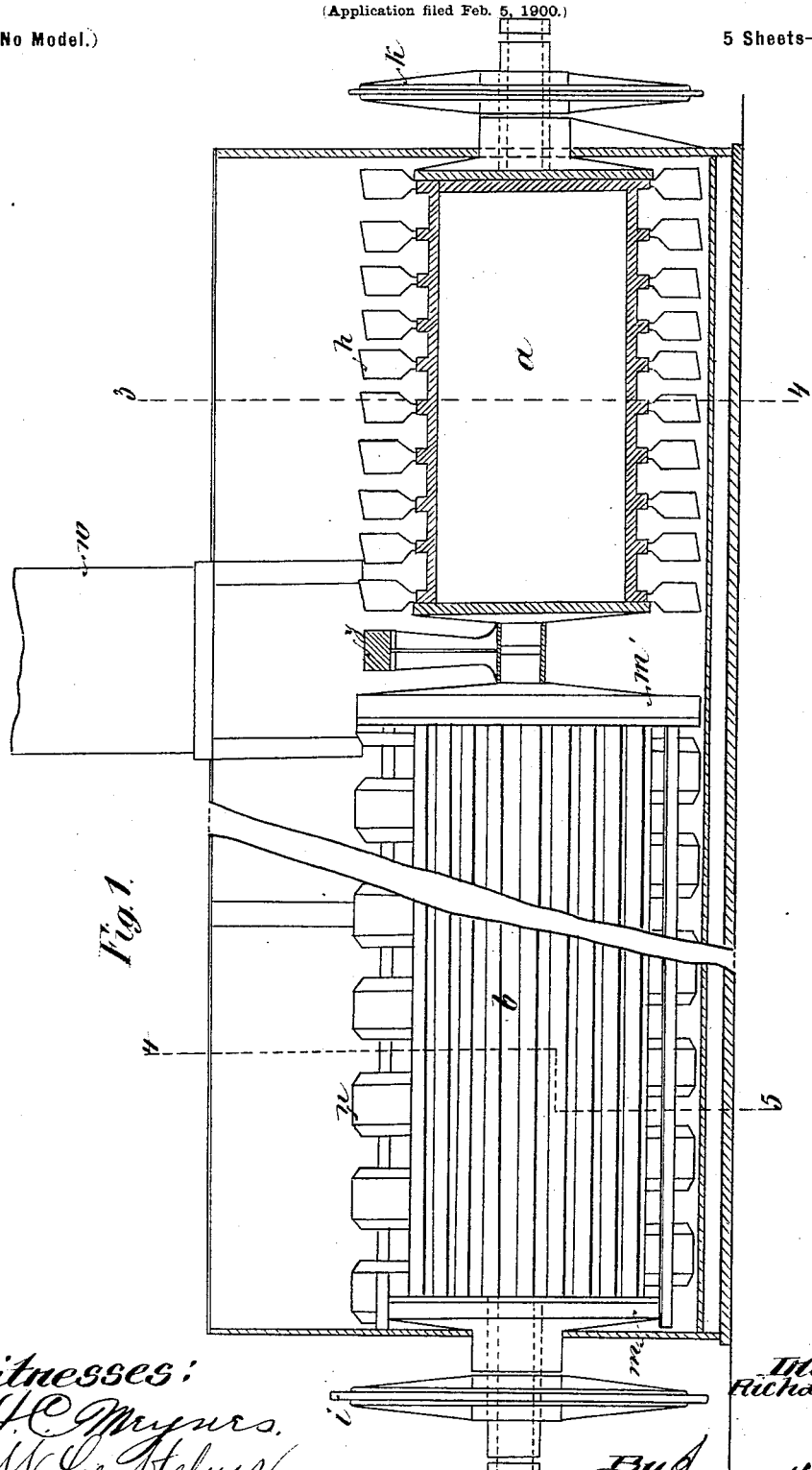
Figure 2:
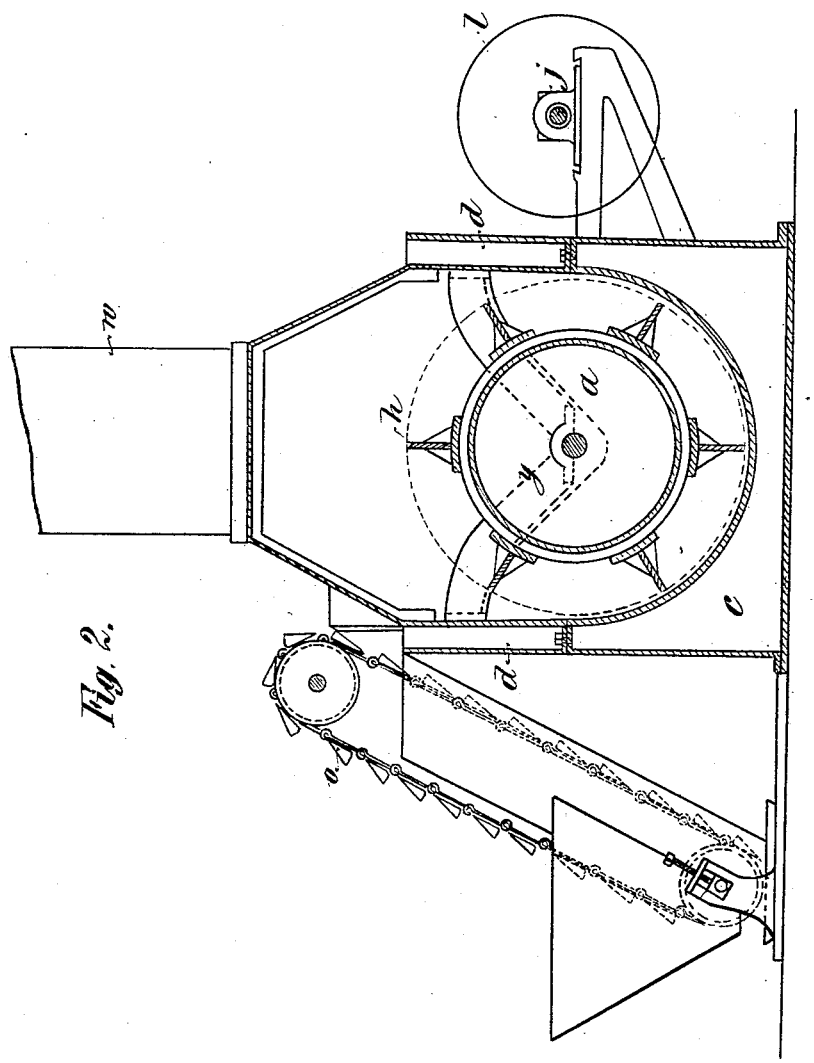
Figure 3:
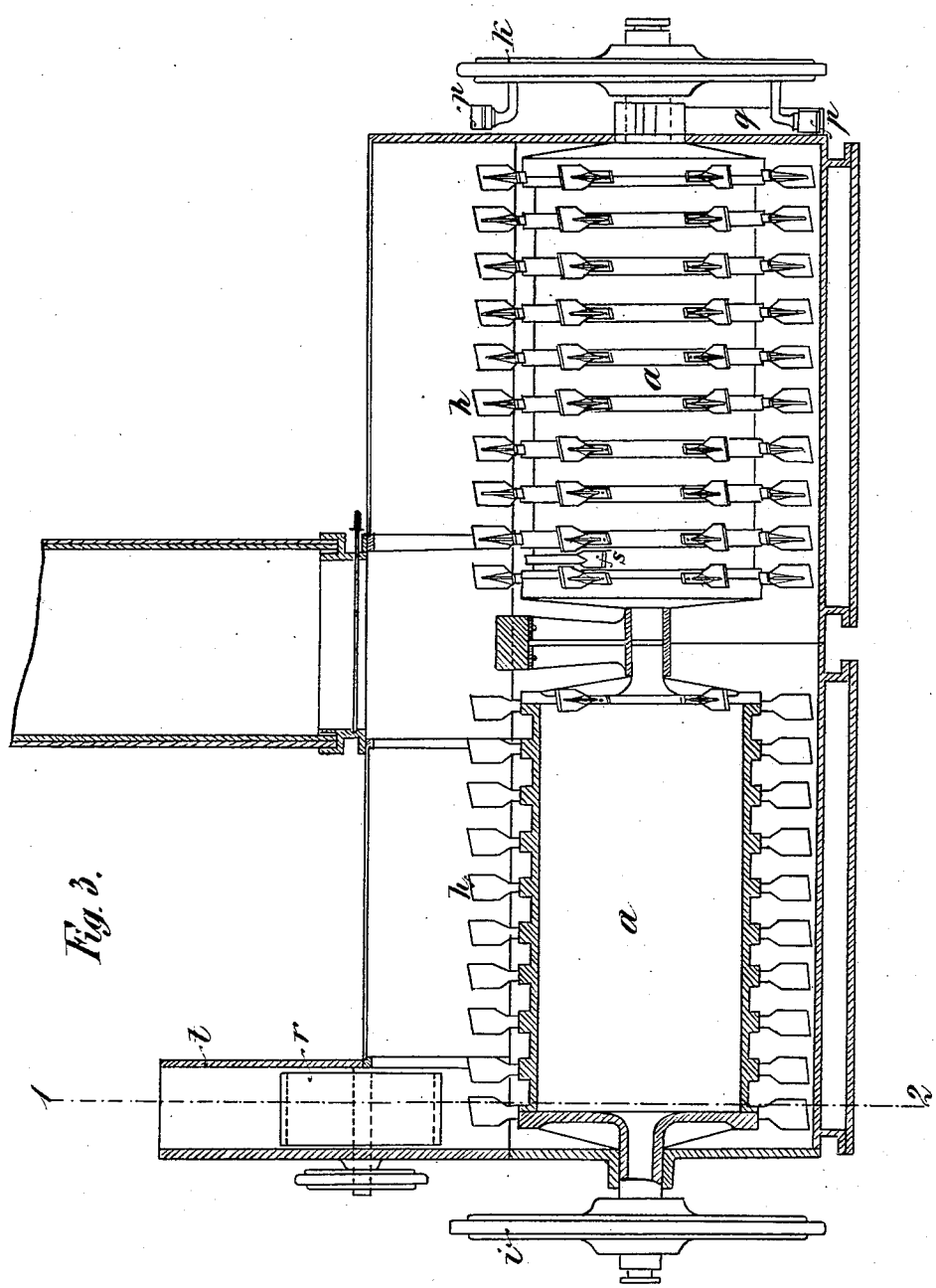
Figure 6:
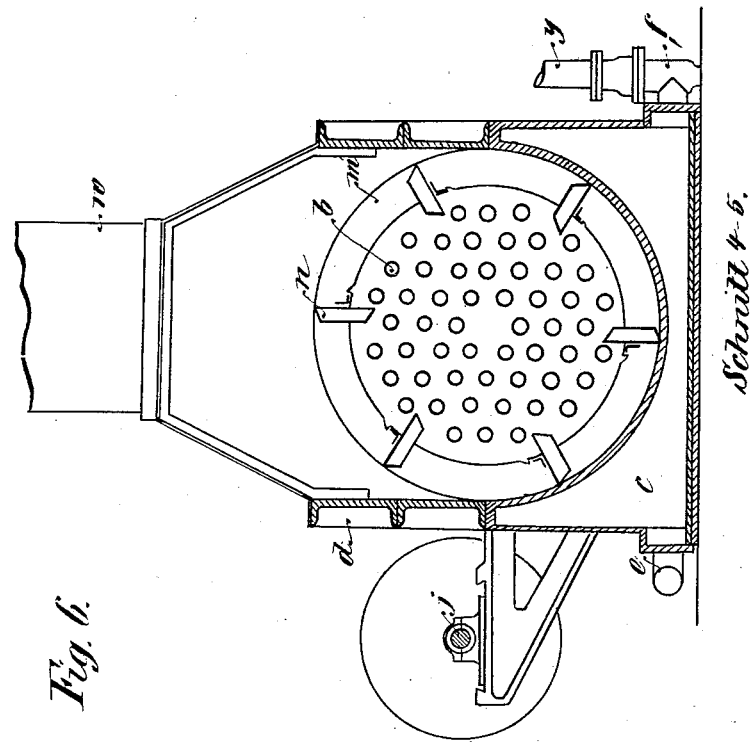
Figure 4:
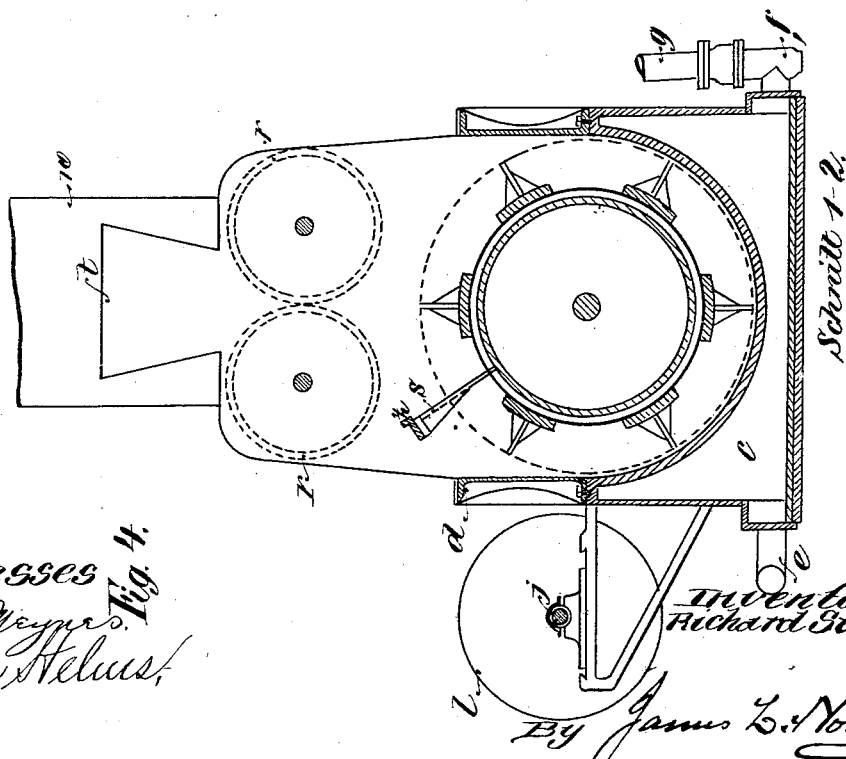
Figure 5:
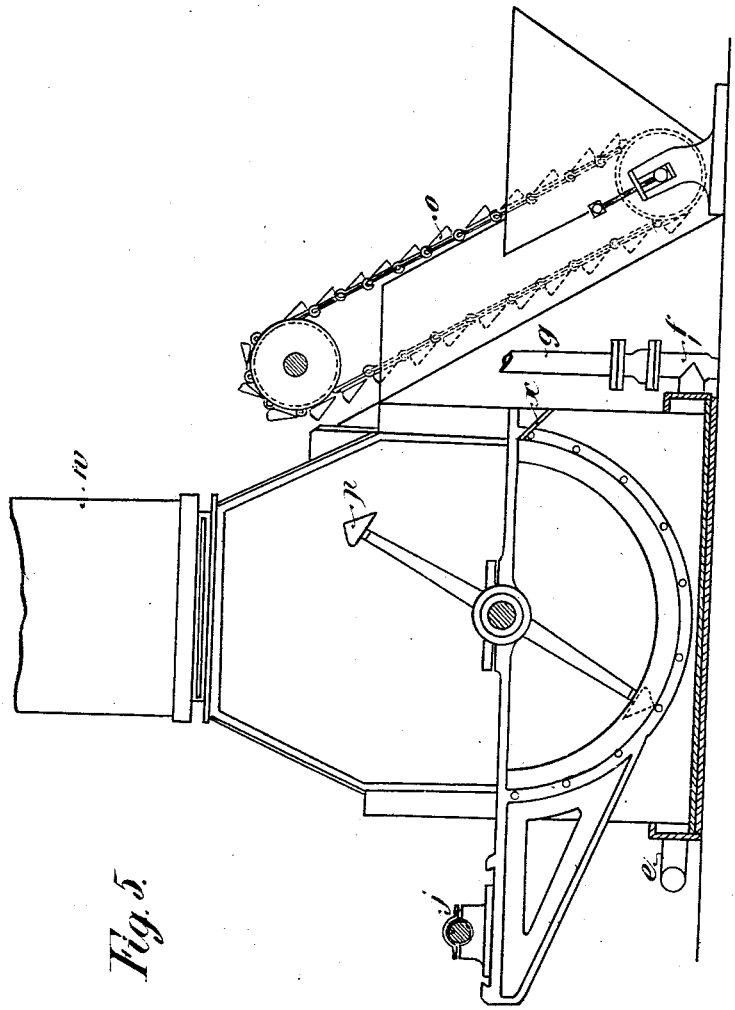

In the drawings forming part of this specification, Figure 1 is a longitudinal section, partly in elevation, of my improved apparatus with part of the paddles removed for the sake of clearness. Fig. 2 is a section on the line 3 4 of Fig. 1. Fig. 3 is a view similar to Fig. 1, showing a modified construction. Fig. 4 is a section on the line 1 2 of Fig. 3. Fig. 5 is an end elevation. Fig. 6 is a section on the line 4 5 of Fig. 1.

The same letters apply to all the figures.

$c$ shows semicircular hollow iron troughs formed of cast-iron, arranged in sections and held together by wrought or cast iron girders or plates, as $d$, which together constitute the sides of the machine. The troughs $c$ are cast hollow, so that steam or other heating medium may circulate therein, being supplied by pipes, as at $e$. The condensed or cooled water is discharged at $f$ and any exhaust-steam or air at $g$.

$a\ a$ are drying-cylinders provided with ribs, which increase the heating-surface and also afford bases on which the paddles $h$ are fixed, but plain cylinders may be used. These cylinders contain steam, which is admitted and discharged by well-known devices through the axles in stuffing-boxes on which the cylinders rest. On these axles are affixed chain-wheels $i$ and $k$, driven from the shaft $j$, by means of which the cylinders $a\ a$ are rotated.

$b$ is a bundle of tubes fixed in the cast-iron heads $m\ m'$, into which steam is admitted and exhausted through the axles in the manner above described.

In Fig. 1 the chain-wheel $i$ is used to rotate the tube bundle $b$.

$h$ shows paddles, and $n$ shovels fixed onto the drying cylinder or cylinders $a$ and the tube bundle $b$, respectively. By means of these the substance to be dried is divided, agitated, exposed to the heated surfaces and air in the troughs and gradually passed from one end of the machine to the other, for which latter purpose some or all are placed or made at an angle, as shown. The number and angle of these, their shape, and the material of which they are made may be varied to suit the substances to be dried.

$j$ is the main shaft of the machine, driven by means of the pulley $l$ or other suitable arrangement, and by suitably-placed chain-wheels thereon giving motion at the different speeds desirable to the chain-wheels $i$ and $k$.

$o$ is an elevator to raise the substance to be dried to the upper portion of the machine, into which it is allowed to fall. By reducing or increasing the number of buckets on the elevator the quantity fed into the machine can be regulated.

$p$ shows scoops attached to the chain-wheel or the discharge end of the machine, which pick up the dried substance from the trough $q$ and throw it into a receptacle suitably placed at the side.

$r$ is a pair of rollers by means of which lumpy and sticky substances may be fed into the machine evenly. They are driven from the shaft $j$ by means of chains or other gearing in the ordinary manner.

$s$ shows scrapers similar in construction to the paddles $h$, fixed on the inner side of the troughs $c$ or vertically carried by cross-bars.

The operation of the machine is of a simple character. Steam being admitted into the interior of the hollow troughs and into the cylinders or tubes or either of them by suitably-arranged steam pipes and valves, the substance to be dried is filled into the machine by either the elevator or the rolls, where it is divided, agitated, and passed on by the paddles $h$ and finally emerges dried into the trough $q$, whence it is removed by means of the scoops.

Having now particularly described and ascertained the nature of my said invention and in what manner the same is to be performed, I declare that what I claim is—

In drying apparatus, the combination with a casing whose bottom is made up of hollow trough-shaped sections for the introduction of a heating medium, and a trough at the discharge end of said casing communicating with the interior thereof, of a hollow rotary drying-cylinder mounted in said casing and having blades thereon designed to agitate the material operated upon and to impart thereto a progressive movement toward the discharge end of the casing, a hollow shaft or axle upon which said cylinder is mounted, a gear-wheel on said shaft through which said cylinder is rotated, and a scoop carried by said gear-wheel and adapted to move within said trough, as and for the purpose set forth.

In witness whereof I have hereunto set my hand in presence of two witnesses.

RICHARD SIMON.

Witnesses:
 HERBERT DERRY,
 THOS. H. COOK.